(12) United States Patent
Yoshimoto et al.

(10) Patent No.: US 8,564,859 B2
(45) Date of Patent: Oct. 22, 2013

(54) IMAGE READING APPARATUS AND IMAGE FORMING APPARATUS

(75) Inventors: Mitsuharu Yoshimoto, Osaka (JP); Kenji Tanaka, Osaka (JP); Kenji Nakanishi, Osaka (JP); Shohichi Fukutome, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 13/202,132

(22) PCT Filed: Jan. 28, 2010

(86) PCT No.: PCT/JP2010/051086
§ 371 (c)(1),
(2), (4) Date: Aug. 18, 2011

(87) PCT Pub. No.: WO2010/100980
PCT Pub. Date: Sep. 10, 2010

(65) Prior Publication Data
US 2011/0299144 A1    Dec. 8, 2011

(30) Foreign Application Priority Data
Mar. 2, 2009  (JP) ................................. 2009-048368

(51) Int. Cl.
*H04N 1/46*    (2006.01)
(52) U.S. Cl.
USPC ............ 358/505; 358/474; 358/475; 358/501
(58) Field of Classification Search
USPC ......................... 358/474, 505, 501, 497, 496
See application file for complete search history.

(56) References Cited

U.S. PATENT DOCUMENTS

| | | | | |
|---|---|---|---|---|
| 5,289,292 A | * | 2/1994 | Osada et al. | 358/451 |
| 5,675,425 A | * | 10/1997 | Imoto et al. | 358/513 |
| 5,870,142 A | * | 2/1999 | Noda et al. | 348/266 |
| 6,198,551 B1 | | 3/2001 | Tabata | |
| 7,388,692 B2 | * | 6/2008 | Mimamino et al. | 358/483 |
| 7,471,426 B2 | * | 12/2008 | Ide et al. | 358/474 |

(Continued)

FOREIGN PATENT DOCUMENTS

| JP | 9-326907 A | 12/1997 |
|---|---|---|
| JP | 2002-290751 | 10/2002 |

(Continued)

OTHER PUBLICATIONS

International Search Report for corresponding International Application No. PCT/JP2010/051086 mailed Mar. 9, 2010.

*Primary Examiner* — Negussie Worku
(74) *Attorney, Agent, or Firm* — Renner, Otto, Boisselle & Sklar, LLP

(57) ABSTRACT

An image reading apparatus comprises: an image reading unit that includes a platen glass and a color contact image sensor configured by a line image sensor for reading red, a line image sensor for reading green, and a line image sensor for reading blue, the line image sensors being disposed in a sub-scanning direction of an original; and an automatic original feeder. In the image reading apparatus, the line image sensor for reading red and the line image sensor for reading green are disposed so that a line gap therebetween is two lines, and in a monochrome mode in which a color original is read and output as a monochrome image, the color original is read using the line image sensor for reading red and the line image sensor for reading green.

14 Claims, 10 Drawing Sheets

(56) References Cited

U.S. PATENT DOCUMENTS

| | | | |
|---|---|---|---|
| 7,626,735 B2 * | 12/2009 | Mizuhashi et al. | 358/474 |
| 7,864,386 B2 * | 1/2011 | Tanimoto et al. | 358/496 |
| 7,961,361 B2 * | 6/2011 | Kawai | 358/474 |
| 7,990,582 B2 * | 8/2011 | Ide et al. | 358/474 |
| 8,144,375 B2 * | 3/2012 | Tanimoto et al. | 358/474 |
| 8,174,734 B2 * | 5/2012 | Inukai | 358/448 |
| 8,253,998 B2 * | 8/2012 | Tsurui | 358/505 |
| 2004/0174575 A1 * | 9/2004 | Ide et al. | 358/505 |
| 2005/0063017 A1 * | 3/2005 | Minamino et al. | 358/3.26 |
| 2007/0145233 A1 | 6/2007 | Kaihotsu | |
| 2008/0013133 A1 | 1/2008 | Taguchi | |

FOREIGN PATENT DOCUMENTS

| | | |
|---|---|---|
| JP | 2004-147087 A | 5/2004 |
| JP | 2005-252636 | 9/2005 |
| JP | 2008-22254 A | 1/2008 |
| WO | 2005/088955 A1 | 9/2005 |

* cited by examiner

FIG.9B

Color patch read values

| Colorimetric value | Value read by scanner | | | Color patch |
|---|---|---|---|---|
| L (density) | R | G | B | |
| 90 | 225 | 230 | 234 | C |
| 87 | 214 | 223 | 233 | |
| 83 | 203 | 218 | 232 | |
| 75 | 174 | 203 | 228 | |
| 66 | 141 | 184 | 223 | |
| 58 | 108 | 167 | 218 | |
| 53 | 90 | 160 | 216 | |
| 89 | 234 | 228 | 232 | M |
| 85 | 229 | 218 | 224 | |
| 81 | 226 | 207 | 216 | |
| 72 | 217 | 181 | 196 | |
| 61 | 207 | 149 | 169 | |
| 52 | 198 | 121 | 147 | |
| 47 | 195 | 107 | 137 | |
| 94 | 236 | 233 | 225 | Y |
| 93 | 235 | 231 | 212 | |
| 92 | 235 | 230 | 198 | |
| 91 | 233 | 226 | 167 | |
| 90 | 232 | 223 | 141 | |
| 89 | 231 | 220 | 117 | |
| 89 | 230 | 218 | 101 | |
| 86 | 223 | 222 | 220 | K |
| 82 | 208 | 208 | 209 | |
| 76 | 194 | 194 | 195 | |
| 63 | 160 | 160 | 160 | |
| 47 | 123 | 123 | 122 | |
| 29 | 89 | 87 | 83 | |
| 18 | 72 | 70 | 65 | |
| 88 | 232 | 224 | 223 | R |
| 84 | 228 | 214 | 212 | |
| 80 | 225 | 203 | 199 | |
| 70 | 216 | 172 | 164 | |
| 59 | 206 | 138 | 121 | |
| 52 | 200 | 114 | 89 | |
| 50 | 197 | 104 | 74 | |
| 90 | 221 | 227 | 224 | G |
| 84 | 208 | 218 | 213 | |
| 80 | 192 | 208 | 199 | |
| 71 | 155 | 184 | 168 | |
| 59 | 113 | 156 | 131 | |
| 51 | 85 | 141 | 106 | |
| 49 | 70 | 134 | 94 | |
| 86 | 222 | 223 | 230 | B |
| 82 | 211 | 213 | 224 | |
| 77 | 198 | 202 | 217 | |
| 65 | 167 | 172 | 198 | |
| 47 | 123 | 132 | 171 | |
| 32 | 90 | 101 | 152 | |
| 24 | 74 | 86 | 144 | |

IMAGE READING APPARATUS AND IMAGE FORMING APPARATUS

TECHNICAL FIELD

The present invention relates to an image reading apparatus that includes a color contact image sensor configured by a plurality of line image sensors, in which photoelectric transducers for reading mutually different colors are arrayed in a sub-scanning direction of an original to be read, and photoelectric transducers for reading the same color are arrayed in the main scanning direction, and an image forming apparatus including such an image reading apparatus.

BACKGROUND ART

Conventionally, as an image reading apparatus mounted to an image forming apparatus such as a copier, a facsimile machine, or a multifunction peripheral, a contact image sensor (CIS) using a unity magnification optical system, with which the size of an image reading apparatus can be reduced, has become widely used instead of a CCD used for an reduction optical system.

Also, the use of a color contact image sensor in order to read color original images has been increasing.

FIG. 6A is a schematic configuration diagram of a reading unit of an image reading apparatus that includes a conventional color contact image sensor, and FIG. 6B is a schematic configuration diagram showing an enlarged view of a portion of the color contact image sensor.

The image reading apparatus is configured by an original reading unit 200 and an automatic original feeder 300, and the original reading unit 200 includes a color contact image sensor unit (hereinafter also referred to as a "CIS unit") 110 that reads an image on one face of a transported original.

The CIS unit 110 includes three line image sensors 111, 112 and 113 for the colors R, G and B, in which photoelectric transducers for reading mutually different colors are arrayed in a sub-scanning direction X1 of an original to be read, and photoelectric transducers for reading the same color are arrayed in a main scanning direction (direction perpendicular to the page). The CIS unit 110 irradiates the read face of the original with light from a light source unit 145, the light reflected on the read face forms an image on the line image sensors 111, 112 and 113 for the colors R, G and B with an SLA (Selfoc lens array; "Selfoc lens" is a registered trademark) 146, for example, and thereby image information is read. Note that Patent Document 1 discloses a color contact image sensor unit in which line image sensors for the colors R, G and B are disposed in this order at a two-line pitch. The color contact image sensor unit of Patent Document 1 includes line sensors for the colors R (red), G (green) and B (blue) arrayed with different colors in a sub-scanning direction and the same colors in the main scanning direction of an original to be read, an RB data bus switching unit that performs a first switching process in which, with respect to image data read by the line sensors for the colors R, G and B, data of any two colors are switched and data of the remaining one color is allowed to pass without switching, an inter-line correction unit that outputs image data for the three colors R, G and B obtained by the RB data bus switching unit performing the first switching process as a RGB data set, and an RB data bus switching unit that receives image data obtained by the inter-line correction unit performing the inter-line correction process, and switches again the image data pieces of the two colors that have undergone the first switching process, and outputs the resultant data.

PRIOR ART DOCUMENTS

Patent Documents

[Patent Document 1] JP 2008-22254A

SUMMARY OF INVENTION

Problems to be Solved by the Invention

In the CIS unit 110 configured as described above, in a color reading mode in which a color original is read and output as a color image, the color original is read by the three line image sensors 111, 112 and 113 for the colors R, G and B to form a color image. On the other hand, in a monochrome reading mode in which a color original is read and output as a monochrome image, a color original is read by the line image sensor 112 for the color G to form a monochrome image.

However, in the case where a color original is read only with the line image sensor 112 for the color G to form a monochrome image, contrast in the monochrome image may not be clear depending on the hue of the color original, and thus there has been a problem that the resulting monochrome image may overall have a dull hue (may not have clear contrast).

In order to solve this problem, it is possible to form a monochrome image that has clearer contrast by reading a color original, in the monochrome reading mode, to form the monochrome image with line image sensors for two colors (for example, the line image sensor 111 for the color R and the line image sensor 112 for the color G) among the three line image sensors 111, 112 and 113 for the colors R, G and B. In this case, an operation for line correction is necessary for the line image sensors 111 and 112 for two colors, and an operation for line delay is necessary in order to perform the line correction.

Outline of the line correction and the line delay will be described here with reference to FIG. 7. Note that FIG. 7 is a diagram schematically illustrating a state in which an original G is transported in a sub-scanning direction X1 while keeping the CIS unit 110 configured as described above stationary, and an image of a pattern in which a white portion and a black portion, each portion being formed by two dots, alternately continue in the sub-scanning direction X1 is read by the CIS unit 110 in the sub-scanning direction X1. For the purpose of simplicity, in FIG. 7, the CIS unit 110 is illustrated shifted to the right side relative to the black-and-white pattern on the original G.

As shown in FIG. 7, when the line image sensors 111, 112 and 113 for the colors R, G and B are disposed in the sub-scanning direction X1 at one-line intervals (one-line gaps), the line data of an original read at a certain point of time is made up of data pieces read in positions that are mutually displaced by one line in the sub-scanning direction X1.

For example, when a white pixel P1 is focused on, the portion of the pixel of interest P1 is read first by the line image sensor 111 for the color R, and then by the line image sensor 112 for the color G and lastly by the line image sensor 113 for the color B, as scanning advances. Accordingly, by appropriately delaying the outputs from the line image sensors 111, 112 and 113 that each read original line data in a main scanning direction Y (direction orthogonal to the sub-scanning direction X1), the outputs from the line image sensors 111, 112 and 113 can be corresponded to line data of the same portion of the original. Line correction is processing for performing correction on the line data of each color so as to generate the line data for the same portion of the original in this manner.

That is, the line correction requires a function for delaying line data. For example, if the interval between the line image sensors 111, 112 and 113 is a one-line interval, by delaying the line data read by the line image sensor 111 for the color R by two lines, and the line data read by the line image sensor 112 for the color G by one line, the reception timing of these line data pieces can be matched to the reception timing of the line data from the line image sensor 113 for the color B. Such an operation constitutes line delay.

Here, in the case of a high image quality reading mode (for example, a 600 dpi resolution), even if the line image sensors 111, 112 and 113 for the colors R, G and B are disposed at one-line gaps, it is sufficient to delay the line data of the line image sensor 111 for the color R by two lines and the line data of the line image sensor 112 for the color G by one line.

In contrast, in the case of a speed-priority reading mode (for example, a resolution of 300 dip), since the reading is performed at double speed, it is necessary to delay the line data of the line image sensor 111 for the color R by one line, and the line data of the line image sensor 112 for the color G for 0.5 line, and line correction cannot be performed with only line delay. Therefore, in order to realize line delay, it is necessary to generate, with respect to the line data read by the line image sensor 112 for the color G, pseudo data from the pixel data of the preceding dot and the subsequent dot in the sub-scanning direction X1.

FIG. 8A is a diagram illustrating an image of reading by the line image sensors in the case where the original image of the black-and-white pattern shown in FIG. 7 is read at a resolution of 600 dpi, that is, in the high image quality reading mode. FIG. 8B is a diagram illustrating an image of reading by the line sensors in the case where the original image of the black-and-white pattern shown in FIG. 7 is read at a resolution of 300 dpi, that is, in the speed-priority reading mode.

In the case of the high image quality reading mode (600 dpi resolution) shown in FIG. 8A, even if the line image sensors 111, 112 and 113 for the colors R, G and B are disposed at one-line gaps as shown in FIG. 7, the pixels in the sub-scanning direction X1 are read by each of the three line image sensors 111, 112 and 113, and thus it is sufficient to delay the line data of the line image sensor 111 for the color R by two lines, and the line data of the line image sensor 112 for the color G by one line.

However, in the case of the speed-priority reading mode (300 dpi resolution) shown in FIG. 8B, since reading is performed at double speed, line data read by the line image sensors 111, 112 and 113 is data of every other dot. Therefore, with respect to the pixel of interest P1, although the line image sensor 113 for the color B and the line image sensor 111 for the color R read the pixel of interest P1, the line image sensor 112 for the color G does not read the pixel of interest P1 and reads pixels P11 and P12 on the lines before and after the line of the pixel of interest P1. Accordingly, in order to realize line delay, with respect to the data of the pixel of interest P1 that has not been read by the line image sensor 112 for the color G, it is necessary to generate pseudo data from the data of the pixels P11 and P12 of the preceding dot and the subsequent dot in the sub-scanning direction X1. In this case, although there is not a problem if the same data (white data or black data) continues through the pixels P11, P1 and P12, in the portion of the image where a white portion changes to a black portion as shown in FIG. 8B, the pixel P11 has white data and the pixel P12 has black data and thus the image will deteriorate if pseudo data is generated using these pixel data pieces.

Specifically, in the case where the image of pixel of interest P1 is formed in a mode of performing reading at a resolution of 300 dpi, the line image sensor 111 for the color R and the line image sensor 113 for the color B obtain white data as originally expected. However, since the line image sensor 112 for the color G forms the image of the pixel of interest based on the images adjacent thereto on both sides, gray data, which should be white data, is obtained as a result of mixture of black data and white data. Accordingly, when a monochrome image is to be formed using the line data of the line image sensor 111 for the color R and the line data of the line image sensor 112 for the color G, since the line data of the line image sensor 112 for the color G is gray data, original white data becomes light gray data as a result of mixture of white data and gray data, which deteriorates the image.

Here, with respect to the case where a monochrome image is formed from a color image, superiority in forming a monochrome image from a color image using data read by the line image sensor for the color R and data read of the line sensor for the color G will be verified.

FIG. 9B is a table including an L value (density) obtained by reading a color chart shown in FIG. 9A with a measuring device and 8-bit tones (digital value) of each patch therein.

Also, the relation between the colorimetric value (L value) and read values R, G and B of the measuring device is defined by Expression (1) indicated below.

$$L = l \times R + m \times G + n \times B \tag{1}$$

When variables l, m and n that satisfy Expression (1) are obtained based on the colorimetric values (L value) and the read values R, G and B in the table shown in FIG. 9A, the results are as shown in Table 1.

TABLE 1

| l | m | n | SUM |
|---|---|---|-----|
| 0.138 | 0.254 | 0.003 | 0.394 |

Accordingly, when normalization is performed such that the total of the variables l, m and n is 1, the results are as shown in Table 2.

TABLE 2

| l | m | n | SUM |
|---|---|---|-----|
| 0.350 | 0.643 | 0.006 | 1.000 |

It is understood from the values in Table 2 that the color B has little relation to the L values, and the colors G and R are related thereto. Accordingly, it is understood that the colors G and R can be used for reading a color image and outputting the image as a monochrome image with good reproducibility.

The present invention has been achieved in order to solve problems based on the verification results described above, and the object thereof is to provide an image reading apparatus that can secure reproducibility of image density when a monochrome image is formed by reading a color original with a color contact image sensor, and can prevent image deterioration even when reading is performed at a low resolution, and an image forming apparatus including such an image reading apparatus.

Means for Solving the Problems

In order to solve the above problems, an image reading apparatus of the present invention is an image reading apparatus including: an image reading unit that includes a platen glass and a color contact image sensor configured by a line image sensor for reading red, a line image sensor for reading green, and a line image sensor for reading blue, the line image sensors being disposed in a sub-scanning direction of an original; and an automatic original feeder, wherein the line image sensor for reading red and the line image sensor for reading green are disposed so that a line gap therebetween is two lines, and in a monochrome mode in which a color original is read and output as a monochrome image, the color original is read using the line image sensor for reading red and the line image sensor for reading green. Also, as the monochrome modes, two modes consisting of a high image quality reading mode (for example, a mode for performing reading at a resolution of 600 dpi) and a speed-priority reading mode (for example, a mode for performing reading at a resolution of 300 dpi), in which reading is performed at mutually different resolutions, are provided.

In this manner, by using the line image sensor for reading red and the line image sensor for reading green, reproducibility of the image can be secured. Also, by setting the line gap between the line image sensor for reading red and the line image sensor for reading green to a two-line gap, integer interpolation is made possible, and therefore image deterioration can be prevented.

Also, according to the present invention, it is preferable that the line image sensor for reading red (R) and the line image sensor for reading green (G) are disposed with the line image sensor for reading blue (B) being disposed therebetween. In order to obtain an image widely in a sub-scanning direction with the CIS, it is necessary to arrange a plurality of Selfoc lens arrays. However, this invites an increase in cost and therefore, the line gap in a typical CIS is set to a one-line gap. In this case, when the photoelectric transducers are arrayed in the order of R, B and G, the line gap between the line image sensor for the color R and the line image sensor for the color G, which is important for a monochrome image, is set to a two-pixel (two-line) gap, and thus it becomes possible to perform line correction without image deterioration even in the mode performed at a resolution of 300 dpi, which is a speed-priority reading mode.

Also, according to the present invention, the line image sensors for two colors are a line image sensor for reading red, and a line image sensor including for reading green. When the line image sensors are arranged in the order of R, B and G at one-line gaps, data of the color R and the color G can be used without deterioration. Also, by setting the line gap to a one-line gap, the line memory required in the mode performed at a resolution of 600 dpi, which is the high image quality reading mode, is only for two lines, and memory can be minimized.

Incidentally, with a conventional sub-scanning motor magnification, quasi-interpolation is necessary for performing line correction, which inevitably causes image deterioration. Also, with respect to magnification by a motor, a magnification with which a resonance point of the motor is matched is present, and thus a member such as a flywheel is necessary. However, by limiting the motor magnification to two speeds, the high image quality mode (600 dpi resolution) and the speed-priority mode (300 dpi resolution), motor resonance point can be avoided, which makes it possible to eliminate a member such as a flywheel.

Note that the color contact image sensor is provided on a transport path of an automatic original feeder. More specifically, the color contact image sensor is provided so as to be movable along a bottom face of a platen glass, and reads an original placed on the platen glass.

Also, an image forming apparatus of the present invention includes the image reading apparatus of the present invention described above. Accordingly, the image forming apparatus of the present invention can have the same effect as the image reading apparatus of the present invention described above.

Effects of the Invention

With the present invention, in the case where a color original is read with a color contact image sensor and a monochrome image is formed, reproducibility of the image can be secured by using the line image sensor for reading red and the line image sensor for reading green. Also, by setting the line gap between the line image sensor for reading red and the line image sensor for reading green to a two-line gap, integer interpolation is made possible, and therefore, even when two modes, the high image quality reading mode and the speed-priority reading mode, are available, image deterioration can be prevented in either mode.

Also, the size of the apparatus can be reduced by disposing the line image sensor for reading red and the line image sensor for reading green with the line image sensor for reading blue being disposed therebetween. Also, since the line gap between the line image sensors is set to a one-line gap, required line memory is for only two lines, and memory can be minimized.

BRIEF DESCRIPTION OF DRAWINGS

FIG. 9B shows a table listing densities obtained by reading the color chart shown in FIG. 9A with a measuring device and 8-bit tones (digital values) of each patch therein.

MODES FOR CARRYING OUT THE INVENTION

Embodiments of the present invention will be described below with reference to the drawings. Note that the following embodiments are examples of embodying the invention, and do not limit the technical scope of the invention.

Figure 1:
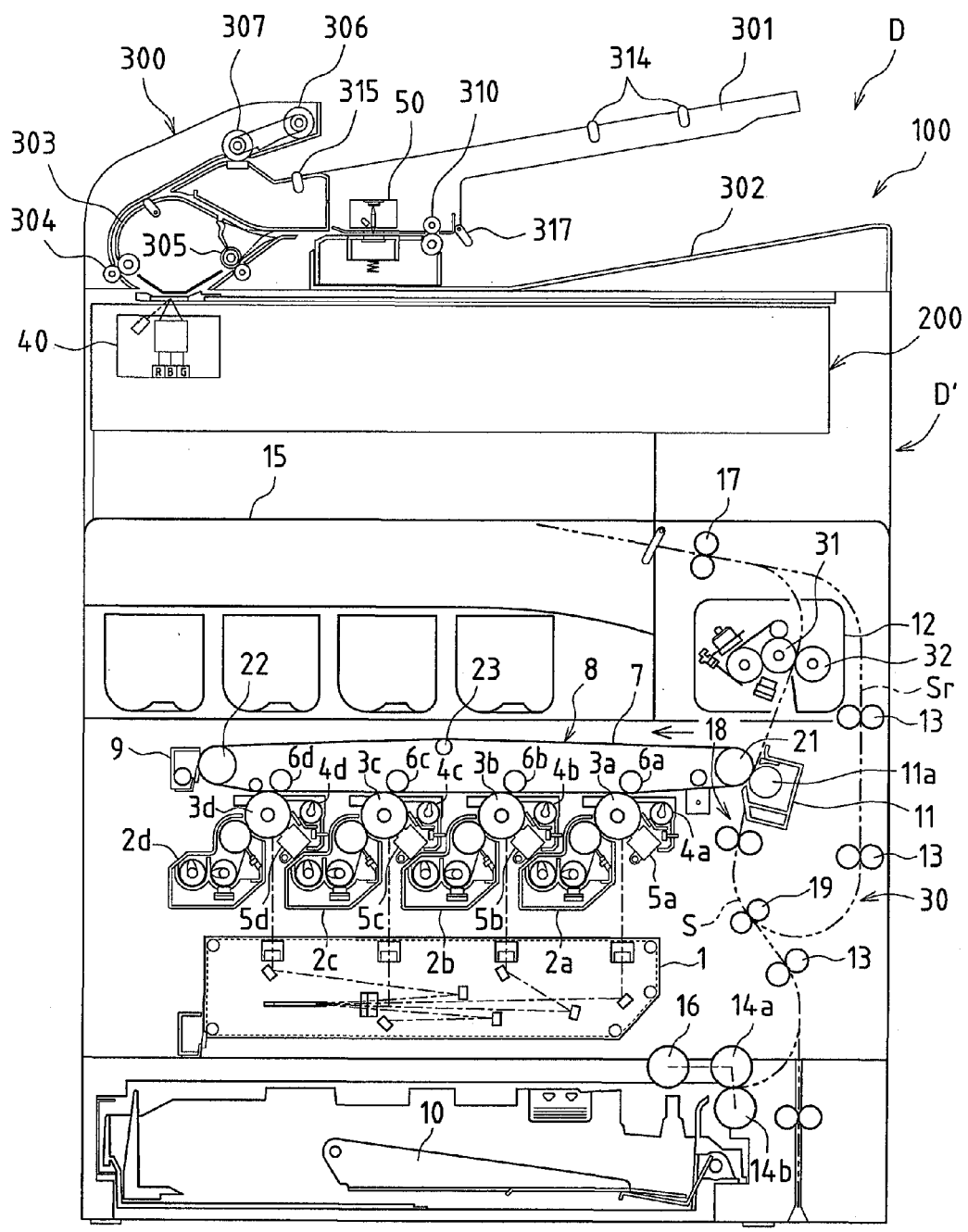
FIG. 1 is a side view schematically showing an image forming apparatus including an image reading apparatus according to an embodiment of the present invention.

FIG. 1 is a side view schematically showing an image forming apparatus D provided with an image reading apparatus 100 according to an embodiment of the present invention.

The image forming apparatus D shown in FIG. 1 is provided with the image reading apparatus 100, which reads an image of an original serving as a target of reading, and an apparatus main body D', which records and forms the image on the original read by the image reading apparatus 100 or images received from the outside source in color or in monochrome on a recording sheet such as plain paper.

Overall Configuration of Image Forming Apparatus

The apparatus main body D' of the image forming apparatus D includes an exposure apparatus 1, development apparatuses 2 (2a, 2b, 2c and 2d), photosensitive drums 3 (3a, 3b, 3c and 3d) that function as image carriers, charging units 5 (5a, 5b, 5c and 5d), cleaning apparatuses 4 (4a, 4b, 4c and 4d), an intermediate transfer belt apparatus 8 that includes intermediate transfer rollers 6 (6a, 6b, 6c and 6d) that functions as a transfer unit, a fixing apparatus 12, a sheet transport apparatus 30, a paper feed tray 10 that functions as a paper feed unit, and a paper discharge tray 15 that functions as a paper discharge unit.

The image data handled in the apparatus main body D' of the image forming apparatus D corresponds to a color image using the colors black (K), cyan (C), magenta (M), and yellow (Y), or corresponds to a monochrome image using a single color (e.g., black). Accordingly, four each of the development apparatuses 2 (2a, 2b, 2c and 2d), the photosensitive drums 3 (3a, 3b, 3c and 3d), the charging units 5 (5a, 5b, 5c and 5d), the cleaning apparatuses 4 (4a, 4b, 4c and 4d), and the intermediate transfer rollers 6 (6a, 6b, 6c and 6d) are provided so as to form four images corresponding to the respective colors, thus forming four image stations. The suffix letters "a" to "d" respectively correspond to black, cyan, magenta, and yellow. In the description below, the suffix letters "a" to "d" are omitted.

The photosensitive drums 3 are arranged substantially in the center of the apparatus main body D' with respect to the vertical direction.

The charging units 5 are charging means for evenly charging the surface of the photosensitive drums 3 to a predetermined potential, and may be of the roller type or of the brush type, which are contact types, but may also be of the charger type.

Here, the exposure apparatus 1 is a laser scanning unit (LSU) including a laser diode and a reflecting mirror, and exposes the surface of the charged photosensitive drums 3 to light according to image data, thereby forming on the surface an electrostatic latent image according to the image data The development apparatuses 2 develop an electrostatic latent image formed on the photosensitive drums 3 with four colors (K, C, M and Y) of toners. The cleaning apparatuses 4 remove and collect toner remaining on the surface of the photosensitive drums 3 after developing and transferring an image.

The intermediate transfer belt apparatus 8 arranged above the photosensitive drums 3 includes, other than the intermediate transfer rollers 6, an intermediate transfer belt 7, an intermediate transfer belt drive roller 21, an idler roller 22, a tension roller 23 and an intermediate transfer belt cleaning apparatus 9.

Roller members such as the intermediate transfer belt drive roller 21, the intermediate transfer rollers 6, the idler roller 22, the tension roller 23 or the like support the intermediate transfer belt 7 in a stretched and tensioned manner, and rotate the intermediate transfer belt 7 around in a prescribed sheet transport direction (direction of the arrow in the drawing).

The intermediate transfer rollers 6 are rotatably supported inside the intermediate transfer belt 7, and pressed against the photosensitive drums 3 via the intermediate transfer belt 7.

The intermediate transfer belt 7 is provided contacting the respective photosensitive drums 3, and the toner images on the surfaces of the respective photosensitive drums 3 are sequentially transferred and superposed on the intermediate transfer belt 7, forming a color toner image (a toner image containing the respective colors). Here, the transfer belt 7 is formed as an endless belt using a film having a thickness of 100 μm to 150 μm, approximately.

The toner images are transferred from the photosensitive drums 3 to the intermediate transfer belt 7 using the intermediate transfer rollers 6 pressed against the inner side (back face) of the intermediate transfer belt 7. A high-voltage transfer bias (for example, a high voltage of the opposite polarity (+) to the charge polarity (−) of the toner) is applied to the intermediate transfer rollers 6 for transferring the toner images. The intermediate transfer rollers 6 are rollers including a base that is made of a metal (e.g., stainless steel) shaft having a diameter of 8 to 10 mm, the surface of the shaft being covered by an electrically conductive elastic material (e.g., EPDM, urethane foam, etc.). The electrically conductive elastic material enables a high voltage to be evenly applied to a recording sheet.

The apparatus main body D' of the image forming apparatus D further includes a secondary transfer apparatus 11 that includes a transfer roller 11a functioning as a transfer unit. The transfer roller 11a contacts the outer side of the intermediate transfer belt 7.

As described above, toner images on the surfaces of the respective photosensitive drums 3 are superposed on the intermediate transfer belt 7, forming a toner image of colors represented by the image data. The toner images of the respective colors superposed in this manner are transported with the intermediate transfer belt 7, and are transferred on a recording sheet by the secondary transfer apparatus 11.

The intermediate transfer belt 7 and the transfer roller 11a of the secondary transfer apparatus 11 are pressed to each other to form a nip region. A voltage (for example, a high voltage of the opposite polarity (+) to the charge polarity (−) of the toner) is applied to the transfer roller 11a of the secondary transfer apparatus 11 in order to transfer the toner images of the respective colors on the intermediate transfer belt 7 to the recording sheet. Furthermore, in order to constantly maintain the nip region, one of the transfer roller 11a of the secondary transfer apparatus 11 and the intermediate transfer belt-driving roller 21 is made of a hard material (metal, etc.), and the other is made of a soft material such as an elastic roller (elastic rubber roller, foamable resin roller, etc.).

The toner image on the intermediate transfer belt 7 may not be completely transferred by the secondary transfer apparatus 11 to the recording sheet, and toner may remain on the intermediate transfer belt 7. This residual toner causes toner color mixing in the following step. Accordingly, residual toner is removed and collected by the intermediate transfer belt cleaning apparatus 9. The intermediate transfer belt cleaning apparatus 9 includes, for example, a cleaning blade that is in contact with the intermediate transfer belt 7 as a cleaning member, and residual toner can be removed and collected by the cleaning blade. The idler roller 22 supports the intermediate transfer belt 7 from the inner side (back face), and the cleaning blade is in contact with the intermediate transfer belt 7 to press from outside against the idler roller 22.

The paper feed tray 10 is a tray in which recording sheets are stored, and is disposed below the image forming unit of the apparatus main body D'. The paper discharge tray 15 disposed above the image forming unit is a tray on which printed recording sheets are placed facedown.

In addition, in the apparatus main body D' is provided the sheet transport apparatus 30 for feeding the recording sheet in the paper feed tray 10 to the paper discharge tray 15 via the secondary transfer apparatus 11 and the fixing apparatus 12. The sheet transport apparatus 30 includes an S-shaped sheet transport path S, and transport members such as a pickup roller 16, an isolating roller 14a, a separation roller 14b, transport rollers 13, a pre-registration roller pair 19, a registration roller pair 18, the fixing apparatus 12 and discharge rollers 17 are arranged along the sheet transport path S.

The pickup roller 16 is a draw-in roller that is disposed in a downstream side end portion in the sheet transport direction of the paper feed tray 10 and that feeds recording sheets sheet by sheet from the paper feed tray 10 into the paper transport path S. The isolating roller 14a allows recording sheets to pass between the isolating roller 14a and the separation roller 14b to separate the sheets into individual sheets and transports the separated sheets to the sheet transport path S. The transport rollers 13 and the pre-registration roller pair 19 are small rollers for facilitating and assisting transportation of the recording sheets. The transport rollers 13 are disposed in plural locations in the sheet transport path S. The pre-registration roller pair 19 is disposed in a position right before the registration roller pair 18 on the upstream side in the sheet transport direction, and transports the recording sheet to the registration roller pair 18.

The fixing apparatus 12 receives a recording sheet onto which a toner image has been transferred, and transports the recording sheet while sandwiching the recording sheet between a heating roller 31 and a pressure roller 32.

The temperature of the heating roller 31 is controlled to a prescribed fixing temperature, and performs thermal pressing on the recording sheet with the pressure roller 32 to melt, mix and press the toner images transferred on the recording sheet, thereby thermally fixing the toner images on the recording sheet.

After the toner images of the respective colors are fixed, the recording sheet is discharged to the paper discharge tray 15 by the discharge rollers 17.

Note that it is possible to form a monochrome image by using only one of the four image forming stations, and transfer the monochrome image to the intermediate transfer belt 7 of the intermediate transfer belt apparatus 8. The monochrome image is also transferred to the recording sheet from the intermediate transfer belt 7, similarly to the color image, and fixed on the recording sheet.

Also, in the case where an image is formed not only on the front face of the recording sheet, but on both faces, after the image on the front face of the recording sheet is fixed by the fixing apparatus 12, the discharge rollers 17 are stopped while the recording sheet is transported by the discharge rollers 17 in the sheet transport path S, and then discharge rollers 17 are rotated in reverse to allow the recording sheet to pass a front-back reverse route Sr. The front and back faces of the recording sheet are then inverted, and the recording sheet is again guided to the registration roller pair 18. Then, an image is recorded and fixed on the back face of the recording sheet similarly to the front face of the recording sheet, and the recording sheet is discharged to the paper discharge tray 15.

Overall Configuration of Image Reading Apparatus

Figure 2:
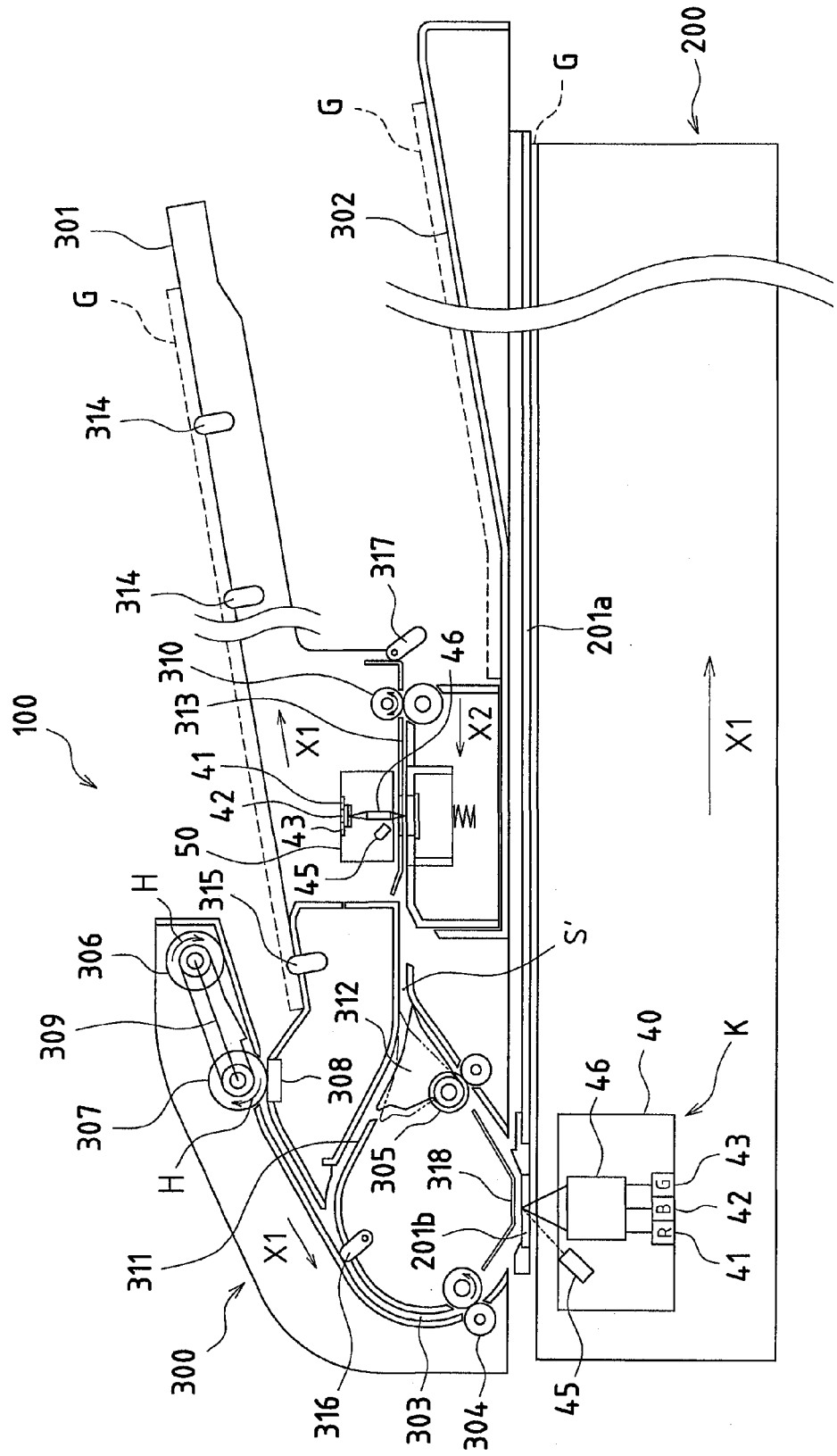
FIG. 2 is a schematic cross-sectional view of the image reading apparatus shown in FIG. 1.

FIG. 2 is a schematic cross-sectional view of the image reading apparatus 100 shown in FIG. 1.

The image reading apparatus 100 shown in FIGS. 1 and 2 is provided with a configuration to read an original image while keeping the original fixed in a stationary original reading arrangement, and a configuration to read an original image while moving the original in a moving original reading arrangement.

The image reading apparatus 100 includes an original reading unit 200 and an automatic original feeder 300. The original reading unit 200 includes a first image reading means 40 that reads an image on one face (front face side) of the original G that is transported, and a second image reading means 50 that reads an image of the other face (back face side) of the original G that is transported (note that the second image reading means 50 is disposed within the automatic original feeder 300).

That is, first image reading means 40 is configured by a color contact image sensor unit (CIS unit) 40 that irradiates the front face side (read face) of the original G placed on a platen glass 201a with light from a light source unit 45 such as an LED array, causes the light reflected on the read face to form an image on line image sensors 41, 42 and 43 for the colors R, B and G with a Selfoc lens array 46, for example, thereby reading image information, and includes a stationary original reading mechanism, not shown in the drawings, that reads an original image that is reflected light from the original G, while moving the CIS unit 40 in the sub-scanning direction (direction of the arrow X1 in the drawings), and a moving original reading mechanism, not shown in the drawings, that irradiates the original G transported in the sub-scanning direction X1 so as to pass over an original reading glass 201b with light via the original reading glass 201b from the light source unit 45 positioned at a home position K of the original reading unit 200, and reads an original image that is reflected light from the original G. Note that FIG. 2 shows a state in which the light source unit 45 is positioned at the home position K.

The second image reading means 50 is disposed on a switchback transport path 313 to be described later. The second image reading means 50 also has the same configuration as the first image reading means 40, and is configured by a color contact image sensor unit (CIS unit) that irradiates the back face side (read face) of the original G that is transported with light from the light source unit 45 such as an LED array, causes the light reflected on the read face to form an image on the line image sensors 41, 42 and 43 for the colors R, B and G with the Selfoc lens array 46, for example, thereby reading image information.

The platen glass 201a is made of a transparent glass plate, and both end portions thereof in the main scanning direction (direction perpendicular to the page) are placed on a frame body (not shown in the drawings). Note that the automatic original feeder 300 is capable of opening and closing (pivotably supported by a hinge, for example) with respect to the original reading unit 200 about an axis line along the transport direction X1 (the same direction as the sub-scanning direction) of the original G, and its bottom face also functions as an original pressing member for pressing the original G placed on the platen glass 201a of the original reading unit 200 from above.

The automatic original feeder 300 includes an original tray 301 on which the original G is placed for transportation, a discharge tray 302 arranged below the original tray 301, a first transport path 303 that connects the original tray 301 and the discharge tray 302, and two transport roller pairs including an upstream side transport roller pair 304 and a downstream side transport roller pair 305 that transport the original G on the upstream side and downstream side, respectively, in a transport direction X1 of the original G, with respect to the original reading glass 201b. Specifically, the upstream side transport roller pair 304, the original reading glass 201b and the downstream side transport roller pair 305 are arranged in this order in the transport direction X1. Also, the original reading glass 201b is disposed substantially horizontally so as to form the transport wall of the first transport path 303.

The automatic original feeder 300 further includes a pickup roller 306, an isolating roller 307 and a separation member 308 such as a separation pad.

The pickup roller 306 feeds forward the original G placed on the original tray 301 from the original tray 301 to the first transport path 303 in the transport direction X1. The isolating roller 307 is arranged on the downstream side in the transport direction X1 relative to the pickup roller 306, and sandwiches the original G sent by the pickup roller 306 with the separation member 308, and further transports the original G to the downstream side in the transport direction X1. The separation member 308 is opposed to the isolating roller 307 and singularizes (separates) the originals G transported therebetween into individual sheets.

The automatic original feeder 300 configured as described above transports the originals G up to between the isolating roller 307 and the separation member 308 by the pickup roller 306, where the originals G are singularized and separated and are at the same time transported sheet by sheet as a result of the isolating roller 307 being driven to rotate. Then, the original G transported by the isolating roller 307 is guided by the first transport path 303, thereby making it possible to feed the original G sheet by sheet toward the upstream side transport roller pair 304.

Specifically, the pickup roller 306 can contact and be separated from the original G placed on the original tray 301 with the use of a pickup roller drive unit not shown in the drawings. In addition, the pickup roller 306 is connected to the isolating roller 307 via a drive transmission means 309 including an endless belt or the like so as to rotate in the same direction as the isolating roller 307. When there is a request to read the original G, the pickup roller 306 and the isolating roller 307 are driven by an original feed drive unit not shown in the drawings to rotate in a direction with which the original G is transported in the transport direction X1 (the arrow H in FIG. 2).

In the present embodiment, the automatic original feeder 300 is also configured such that, after inverting the original G so as to reverse the front and back faces thereof and transporting the original G so as to enable reading one face thereof, the original G can be inverted so as to reverse the front and back faces thereof, thereby transporting the original G so as to enable reading the other face thereof.

Specifically, in addition to the above-described configuration, the automatic original feeder 300 further includes a reverse roller pair 310, a second transport path 311 and a reverse gate 312.

The first transport path 303 is formed as a loop to transport the original G from the isolating roller 307 to the discharge tray 302, via the upstream side transport roller pair 304, the original reading glass 201b, the downstream side transport roller pair 305 and the reverse roller pair 310. The reverse roller pair 310 is disposed on the downstream side in the transport direction X1 relative to the downstream side transport roller pair 305, and transports the original G transported from the downstream side transport roller pair 305 such that the trailing end of the original G (the upstream side end in the transport direction X1) is in the front. The second transport path 311 is branched at a branch portion S' between the reverse roller pair 310 and the downstream side transport roller pair 305, and guides the original G transported by the reverse roller pair 310 such that its trailing end is in the front to the further upstream side in the transport direction X1 than the upstream side transport roller pair 304 of the first transport path 303, in order to invert the front and back faces of the original G. A switchback transport path 313 is formed between the reverse roller pair 310 and the branch portion S' of the first transport path 303. The switchback transport path 313 is capable of transportation of the original G by forward rotation of the reverse roller pair 310 (the transport direction X1 of the original G) and reverse transportation of the original G by reverse rotation of the reverse roller pair 310.

The reverse gate 312 is arranged in the branch portion S', and is configured to be capable of taking a first switching posture in which the original G is guided to the upstream side transport roller pair 304 from the reverse roller pair 310 via the second transport path 311, and a second switching posture in which the original G is guided to the reverse roller pair 310 from the downstream side transport roller pair 305 via the switchback transport path 313.

Here, in a normal state, the reverse gate 312 is arranged directly connecting the switchback transport path 313 and the second transport path 311 (first switching posture, see the solid line in FIG. 2). When the original G whose original image has been read by the original reading unit 200 is transported in the transport direction X1, the leading end of the original G (the downstream side end in the transport direction X1) pushes up the reverse gate 312 to guide the original G to the switchback transport path 313 (second switching posture, see the dashed line in FIG. 2). The reverse gate 312 is capable of freely swaying about a swaying axis along the axis line direction of the reverse roller pair 310 (in the present embodiment, the roller shaft of the downstream side transport roller pair 305 also serves as the swaying axis) such that the reverse gate 312 drops due to its own weight, thereby blocking the first transport path 303 between the downstream side transport roller pair 305 and the reverse roller pair 310 to take the first switching posture. When the trailing end of the original G is positioned in the switchback transport path 313, and the original G is transported in reverse in a reverse-transport direction (direction of the arrow X2 in FIG. 2) that is the opposite direction to the transport direction X1 of the original G by the reverse roller pair 310 rotating in the reverse direction, the reverse gate 312 guides the original G to the second transport path 311.

Note that the size of the original G placed on the original tray 301 is detected by an original size sensor 314 disposed in an original placement unit of the original tray 301. Whether an original G is placed on the original tray 301 or not is detected by an original detecting sensor 315 disposed near the pickup roller 306 of the original placement unit of the original tray 301. Also, in a stopped state, the upstream side transport roller pair 304 causes the leading end of the original G transported by the isolating roller 307 to abut against the same for alignment, and is driven to rotate in accordance with the timing for reading. The original G thus transported is detected by a transport sensor 316 that is disposed on the further downstream side than the second transport path 311 and also on the further downstream side than the upstream side transport roller pair 304, in the transport direction X1 of the first transport path 303. The original G discharged by the reverse roller pair 310 is detected by a discharge sensor 317 disposed near the reverse roller pair 310. Note that the transport roller pairs 304 and 305, the reverse roller pair 310 or the like are driven by a transport system drive unit, which is not shown in the drawings.

Also, in the present embodiment, the original reading unit 200 further includes a reading guide 318 that faces the original reading glass 201b with the transported original G interposed therebetween.

In the image reading apparatus 100 described above, when an instruction to read the original image of the original G by the stationary original reading arrangement is made, the light source unit 45 of the CIS unit 40 moves to one side in the sub-scanning direction X1 at a constant speed while irradiating the original G placed on the platen glass 201a with light via the platen glass 201a, thereby scanning the image of the original G.

Light emitted by the light source unit 45 and reflected from the original G forms an image on the line image sensors 41, 42 and 43 for the colors R, B and G, which are imaging elements, via the Selfoc lens array 46, and here the original image light is read and converted to electric image data.

When an instruction to read the original image on the original G by the moving original reading arrangement is made, the automatic original feeder 300 transports the original G to one side in the sub-scanning direction X1 so as to pass a portion above the position indicated in FIG. 2, while the CIS unit 40 stays in the position indicated in FIG. 2. That is, the originals G placed on the original tray 301 are taken out by the pickup roller 306, separated by the isolating roller 307 and the separation member 308 into individual sheets, and transported to the first transport path 303. After transportation of the original G to the first transport path 303 is confirmed by the transport sensor 316, the leading end of the original G is aligned to prevent slanted transportation of the original G and sent out at a prescribed timing for reading by the upstream side transport roller pair 304, then the front and back faces of the original G are inverted and the original G is transported to the original reading glass 201b.

Onto one face of the original G that passes above the original reading glass 201b, light from the light source unit 45 is irradiated via the original reading glass 201b and reflected by the one face. The light reflected by the one face of the original G forms an image on the line image sensors 41, 42 and 42 for the colors R, B and G, which are imaging elements, via the Selfoc lens array 46, and here the original image is read and converted to electric image data. Note that this reading operation by the line image sensors 41, 42 and 43 is the same in the case of duplex reading to be described later, and the operation will not be described below.

The original G that has been read is drawn off the original reading glass 201b by the downstream side transport roller pair 305, and discharged onto the discharge tray 302 by the reverse roller pair 310, which is capable of forward and reverse rotation, via the switchback transport path 313 of the first transport path 303.

Also, in the case where both faces of the original G, which are one face (front face) and the other face (back face), are read, two methods described below can be used. The first method is a method in which both faces of the original G is read only with the first image reading means (CIS unit) 40 by inverting the front and back faces of the original G. The second method is a method in which the original G is transported to the discharge tray 302 without inverting the front and back faces thereof, and during which the image on the front face side of the original G is read by the first image reading means 40, and then the image on the back face side of the original G is read by a second image reading means (CIS unit) 50.

First, the first method will be described. In the first method, the original G one face of which has been read is not discharged to the discharge tray 302, but transported such that its trailing end is positioned in the switchback transport path 313. The original G is then transported in reverse in the reverse-transport direction X2 by the reverse roller pair 310 rotating in reverse, and guided to the second transport path 311 by the reverse gate 312 in the first switching posture. The original G guided to the second transport path 311 is again returned to the first transport path 303 via the second transport path 311 and as a result, the original G is transported by the upstream side transport roller pair 304 with the front and back faces thereof inverted, passes above the original reading glass 201b, and thus the other face of it is read. The original G both faces of which have been read again returns to the first transport path 303 and is transported by the transport roller pairs 304 and 305 with the front and back faces thereof inverted. Thereafter, the original G passes the switchback transport path 313 of the first transport path 303, and is discharged to the discharge tray 302 via the reverse roller pair 310 rotating in the forward direction.

Next, the second method will be described. In the second method, after the image on the front face side of the original G is read by the first image reading means 40, the image on the back face side of the original G is read by the second image reading means 50 provided on the switchback transport path 313 while the original G is transported from the first transport path 303 to the discharge tray 302 along the switchback transport path 313, and the original G is discharged to the discharge tray 302 via the reverse roller pair 310 rotating in the forward direction.

Note that in the present embodiment, the image reading apparatus 100 has, as a monochrome mode for reading a color original and outputting as a monochrome image, at least two modes, that is, a high image quality reading mode and a speed-priority reading mode performed at different resolutions. More specifically, the resolution of the high image quality reading mode is 600 dpi, and the resolution of the speed-priority reading mode is 300 dpi, for example. That is, the resolution of the high image quality reading mode is an integral multiple of that of the speed-priority reading mode.

Description of CIS Units 40 and 50 of the Present Invention

Embodiments of the CIS units 40 and 50 of the present invention will be specifically described next. Since the CIS unit 40 and the CIS unit 50 have the same internal configuration, here, the CIS unit 40 is described as an example.

Figure 3:
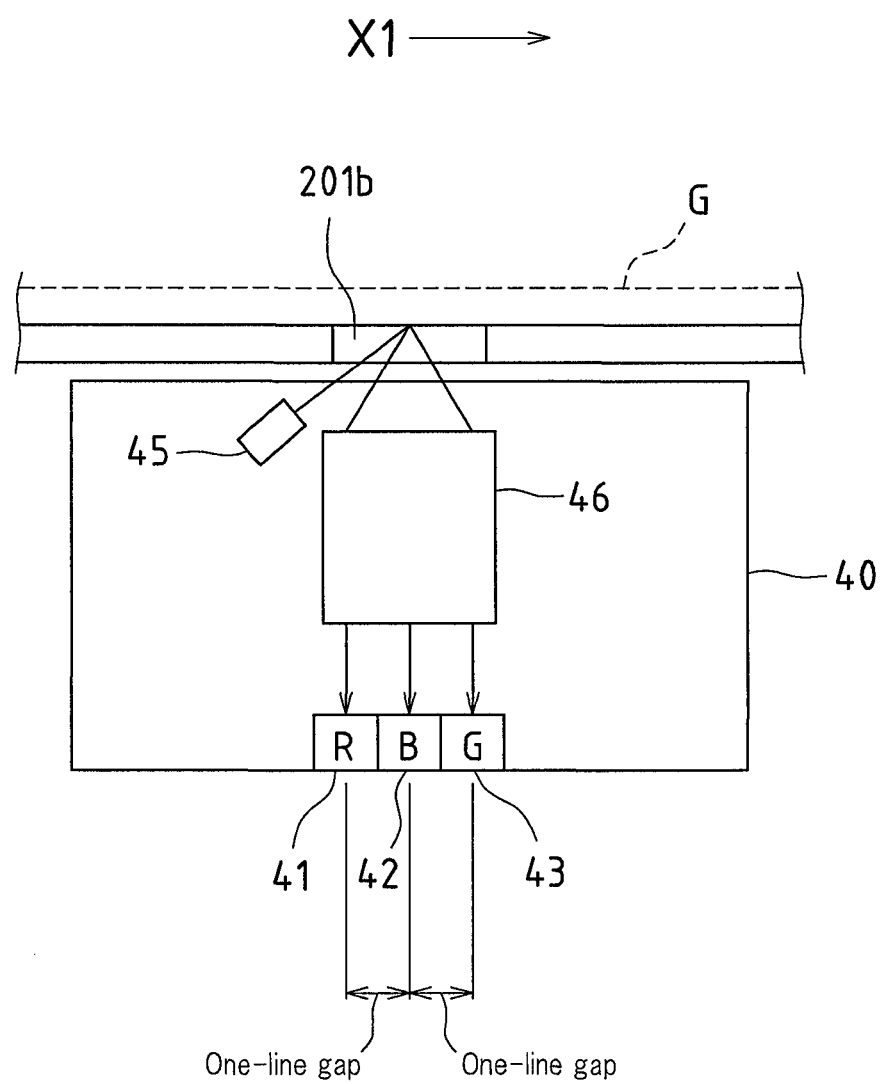
FIG. 3 is an explanatory diagram showing an enlarged view of a CIS unit according to the embodiment of the present invention.

FIG. 3 shows an enlarged view of the CIS unit 40. The CIS unit 40 includes three line image sensors 41, 42 and 43 for the colors R, B and G, in which photoelectric transducers for reading mutually different colors are arrayed in the sub-scanning direction X1 of the original G to be read, and photoelectric transducers for reading the same color are arrayed in the main scanning direction (direction perpendicular to the page). Specifically, the line image sensor 41 for the color R, the line image sensor 42 for the color B and the line image sensor 43 for the color G are disposed in this order in the sub-scanning direction X1 at one-line gaps. In other words, the line image sensor 41 for the color R and the line image sensor 43 for the color G are disposed with the line image sensor 42 for the color B disposed therebetween. Specifically, when the line image sensor 41 for the color R and the line image sensor 43 for the color G are focused on, they are disposed at a two-line gap.

Figure 4A:
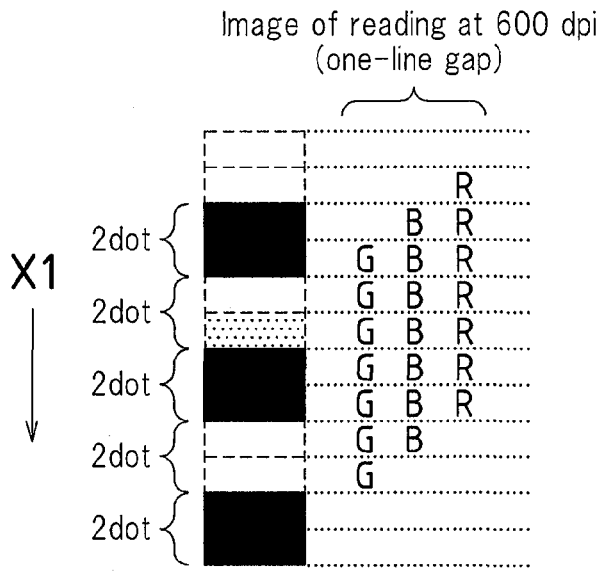
FIG. 4A illustrates an image of reading performed by line image sensors, when an original image of a black-and-white pattern is read in a high image quality reading mode with the CIS unit according to the embodiment of the present invention.
Figure 4B:
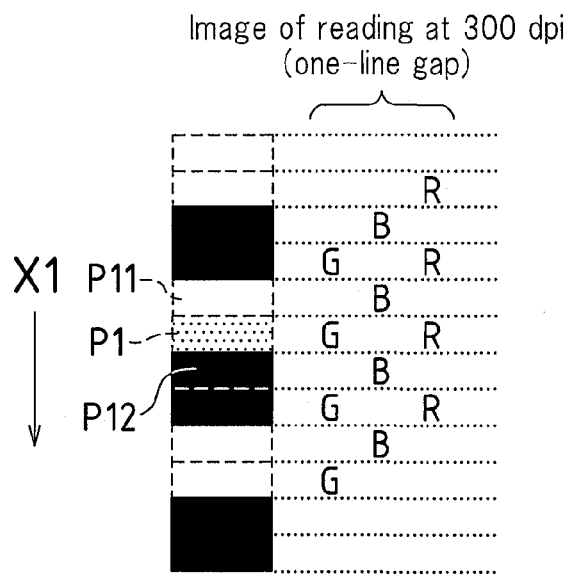
FIG. 4B illustrates an image of reading performed by the line image sensors, when the original image of a black-and-white pattern is read in a speed-priority reading mode with the CIS unit according to the embodiment of the present invention.
Figure 8A:
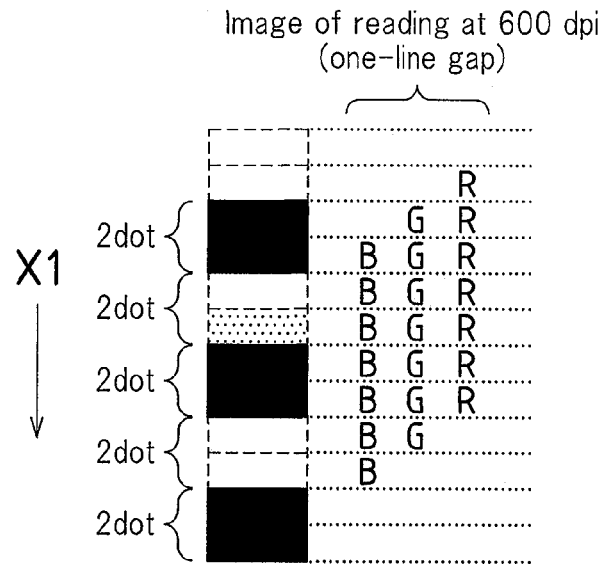
FIG. 8A illustrates an image of reading performed by line image sensors, when an original image of a black-and-white pattern is read in a high image quality reading mode with the CIS unit according to the conventional configuration.
Figure 8B:
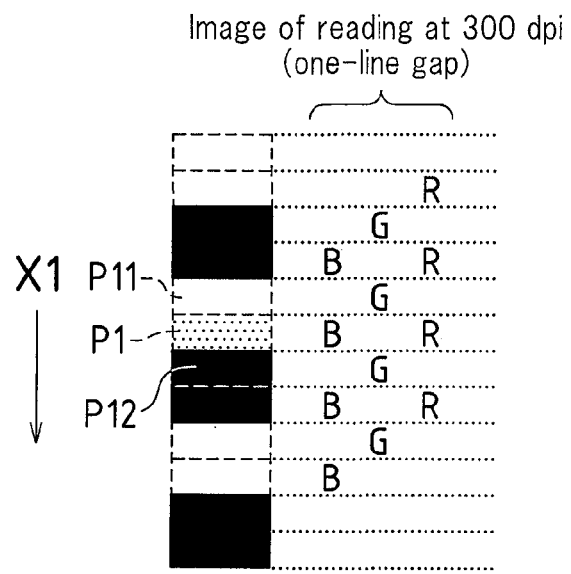
FIG. 8B illustrates an image of reading performed by line image sensors, when an original image of a black-and-white pattern is read in a speed-priority reading mode with the CIS unit according to the conventional configuration.
Figure 9A:
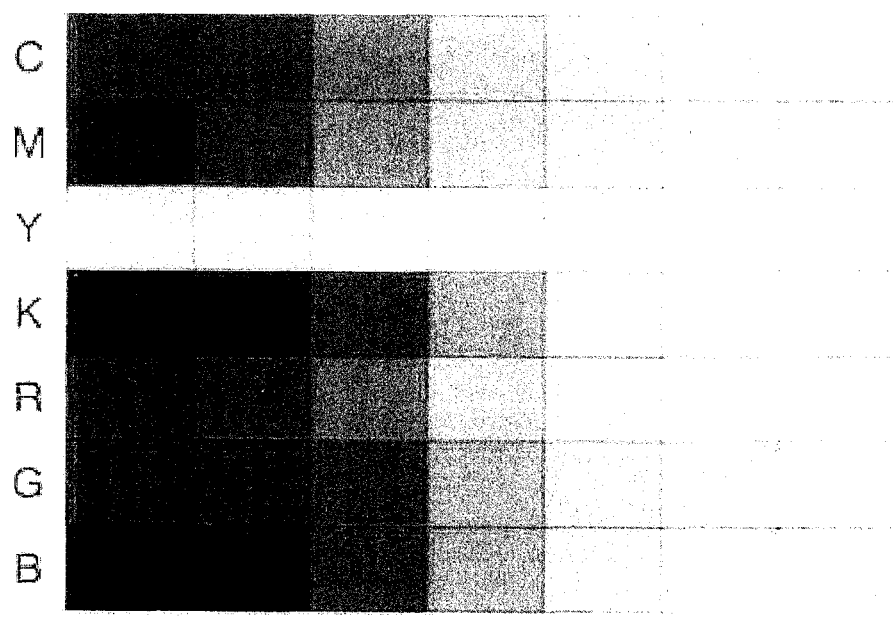
FIG. 9A shows an example of a color chart.

FIG. 4A illustrates an image of reading performed by the line image sensors, when an original on which the same black-and-white pattern as that shown in FIG. 8A is printed is read in the high image quality reading mode, that is, at a resolution of 600 dpi, with the CIS unit 40 according to the present embodiment. FIG. 4B illustrates an image of reading performed by the line image sensors, when the image of the original of the black-and-white pattern is read in the speed-priority reading mode, that is, at a resolution of 300 dpi.

In the case of the high image quality reading mode (600 dpi resolution) shown in FIG. 4A, even if the line image sensors 41, 42 and 43 for the colors R, B and G are disposed at one-line gaps, each pixel is certainly read by the three line image sensors 41, 42 and 43, and thus it is sufficient to delay the line data of the line image sensor 43 for the color G by two lines, and the line data of the line image sensor 42 for the color B by one line.

On the other hand, in the case of the speed-priority reading mode (300 dpi resolution) shown in FIG. 4B, since reading is performed at a double speed, data read by the line image sensors 41, 42 and 43 is data of every other dot. However, with the CIS unit 40 of the present embodiment, with respect to the pixel of interest P1, the pixel of interest P1 is read by both the line image sensor 43 for the color G and the line image sensor 41 for the color R, and the line image sensor 42 for the color B skips the pixel of interest P1 and reads pixels P11 and P12 on the lines before and after the line of the pixel of interest P1. In this manner, the monochrome image of the pixel of interest P1 can be formed from the data read by the line image sensor 41 for the color R and the line image sensor 43 for the color G, and thus it is not necessary to generate pseudo data of the pixel of interest P1 from the data of pixels P11 and P12 of the preceding dot and the subsequent dot in the sub-scanning direction X1, as in conventional techniques. Therefore, the generated monochrome image does not deteriorate.

As described in the conventional technique, the inventor of the present invention has verified superiority in forming a monochrome image using line data read by the line image sensor 41 for the color R and the line data read by the line image sensor 43 for the color G in the case where pseudo data is generated. As a result of the verification, it has been confirmed that the line image sensors for colors G and R may be used for reading a color image and outputting the image as a monochrome image with good reproducibility. Accordingly, by setting the line gap between the line image sensor 41 for the color R and the line image sensor 43 for the color G to a two-line gap as described above, integer interpolation is possible, and accordingly image deterioration can be prevented also in a mode of performing reading at a resolution of 300 dpi.

In order to obtain an image widely in a sub-scanning direction with the CIS unit, it is necessary to arrange a plurality of Selfoc lens arrays. However, this invites an increase in cost and therefore, the line gap in typical CIS units is set to a one-line gap. In this case, when the line image sensors 41 to 43 are arrayed in the order of R, B and G, as in the CIS unit 40 according to the present embodiment, the line gap between the line image sensor 41 for the color R and the line image sensor 43 for the color G, which is important in forming a monochrome image, is set to a two-line gap with the line image sensor 42 for the color B being disposed therebetween, and thus it becomes possible to perform line correction without image deterioration in a high speed-priority reading mode without arranging a plurality of Selfoc lens array 46.

Also, in the present embodiment, since the line image sensors are arranged in the order of R, B and G at one-line gaps, the line memory required in the high image quality reading mode is only for two lines, which provides an advantage of minimizing memory.

Figure 5:
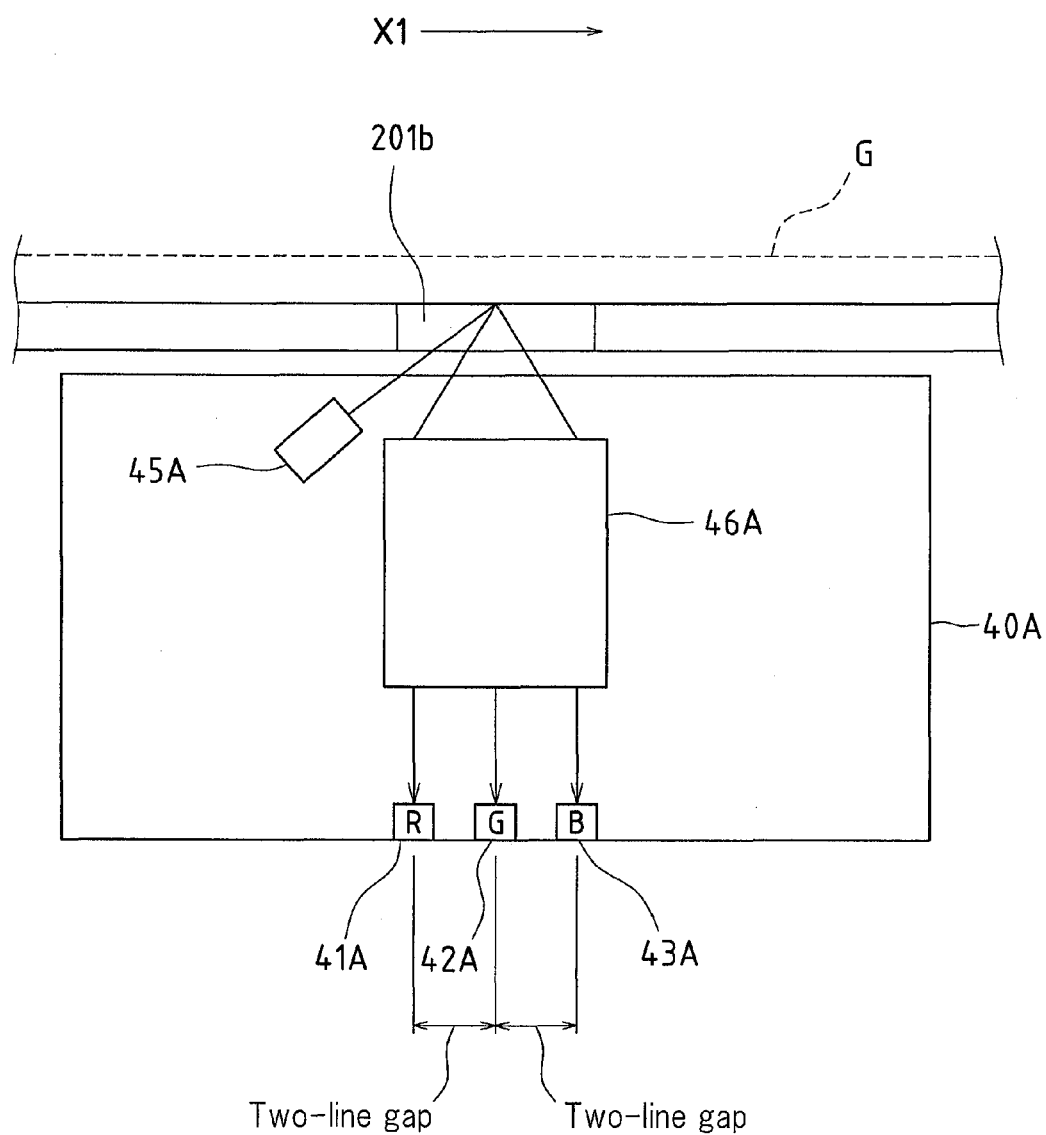
FIG. 5 is an explanatory diagram showing an enlarged view of a CIS unit according to another embodiment of the present invention.
Figure 6A:
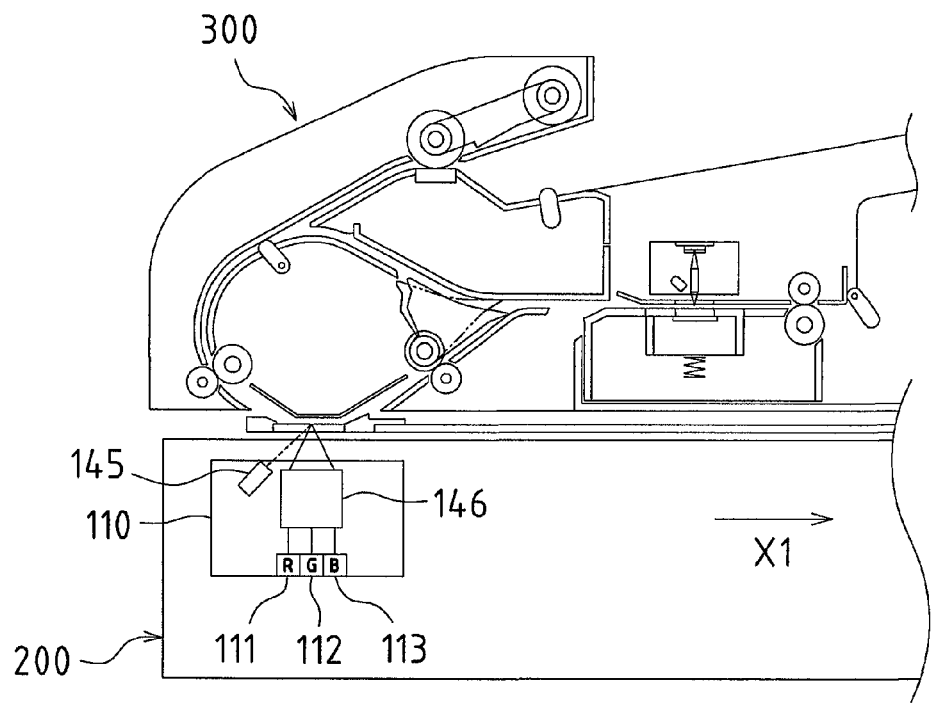
FIG. 6A is a side view showing a schematic disposition configuration of an image reading unit in an image reading apparatus that includes a conventional color contact image sensor.
Figure 6B:
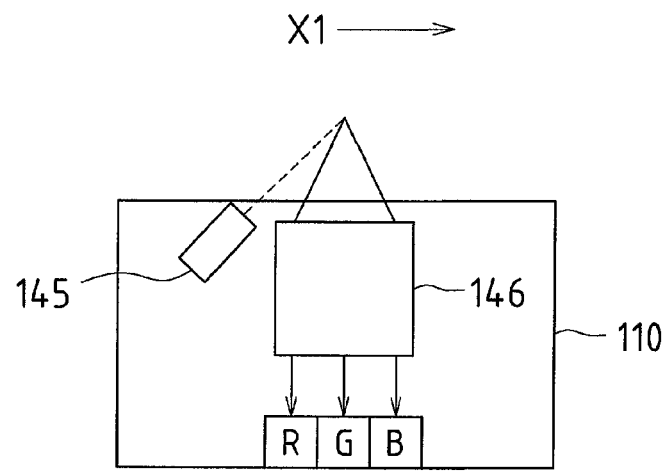
FIG. 6B is an explanatory diagram showing an enlarged view of the portion of a color contact image sensor of the image reading apparatus that includes the conventional color contact image sensor.
Figure 7:
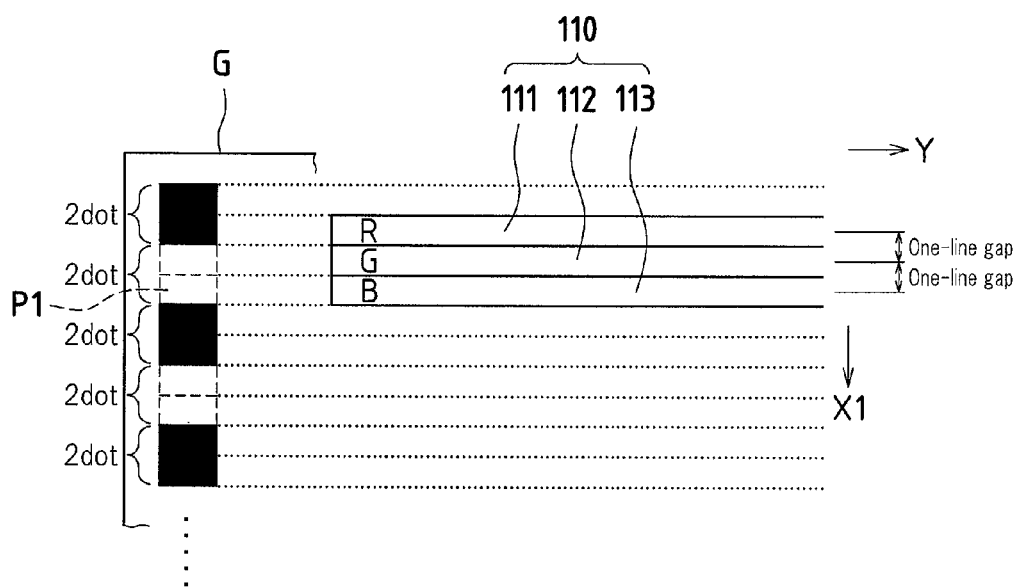
FIG. 7 is an explanatory diagram schematically illustrating the disposition relation of line image sensors relative to an original image, for describing outline of line correction and line delay performed by a CIS unit having a conventional configuration.

FIG. 5 is an explanatory diagram showing an enlarged view of a CIS unit 40A according to another embodiment of the present invention. This CIS unit 40A has a configuration in which three line image sensors 41A, 42A and 43A for the colors R, G and B, in which photoelectric transducers for reading mutually different colors are arrayed in a sub-scanning direction X1 of an original G to be read, and photoelectric transducers for reading the same color are arrayed in the main scanning direction (direction perpendicular to the page), are disposed in the sub-scanning direction X1 in this order at two-line gaps. Specifically, when the line image sensor 41A for the color R and the line image sensor 42A for the color G are focused on, they are disposed at a two-line gap.

In this case, since the line image sensors are arranged in the order of R, G and B at two-line gaps, the line memory required in the color reading mode is for four lines. However, integer interpolation becomes possible when a monochrome image is formed from a color image using the line image sensor 41A for the color R and the line image sensor 42A for the color G, and thus image deterioration can be prevented also in the mode of performing reading at a resolution of 300 dpi.

The present invention may be embodied in various other forms without departing from the gist or essential characteristics thereof. Therefore, the embodiments disclosed in this application are to be considered in all respects as illustrative and not limiting. The scope of the invention is indicated by the appended claims rather than by the foregoing description. All modifications or changes that come within the meaning and range of equivalency of the claims are intended to be embraced therein.

This application claims priority on Japanese Patent Application No. 2009-048368 filed in Japan on Mar. 2, 2009, the entire content of which is incorporated herein by reference.

INDUSTRIAL APPLICABILITY

The present invention can be applied to an image reading apparatus including a color contact image sensor for reading color image originals, and an image forming apparatus including such an image reading apparatus.

| Description of Reference Numerals | |
|---|---|
| D | Image forming apparatus |
| 1 | Exposure apparatus |
| 2 (2a, 2b, 2c and 2d) | Development apparatuses |
| 3 (3a, 3b, 3c and 3d) | Photosensitive drums |
| 4 (4a, 4b, 4c and 4d) | Cleaning apparatuses |
| 5 (5a, 5b, 5c and 5d) | Charging units |
| 6 (6a, 6b, 6c and 6d) | Intermediate transfer rollers |
| 7 | Intermediate transfer belt |
| 8 | Intermediate transfer belt apparatus |
| 9 | Intermediate transfer belt cleaning apparatus |
| 10 | Paper feed tray |
| 11 | Secondary transfer apparatus |
| 11a | Transfer roller |

-continued

| | Description of Reference Numerals |
|---|---|
| 12 | Fixing apparatus |
| 13 | Transport rollers |
| 14a | Isolating roller |
| 14b | Separation roller |
| 15 | Paper discharge tray |
| 16 | Pickup roller |
| 18 | Registration roller pair |
| 19 | Pre-registration roller pair |
| 21 | Intermediate transfer belt drive roller |
| 22 | Idler roller |
| 23 | Tension roller |
| 31 | Heating roller |
| 32 | Pressure roller |
| 30 | Sheet transport apparatus |
| 40 | First image reading means (CIS unit) |
| 41 | Line image sensor for the color R |
| 42 | Line image sensor for the color B |
| 43 | Line image sensor for the color G |
| 40A | First image reading means (CIS unit) |
| 41A | Line image sensor for the color R |
| 42A | Line image sensor for the color G |
| 43A | Line image sensor for the color B |
| 50 | Second image reading means (CIS unit) |
| 100 | Image reading apparatus |
| 201a | Platen glass |
| 201b | Original reading glass |
| 300 | Automatic original feeder |
| 301 | Original tray |
| 302 | Discharge tray |
| 303 | First transport path |
| 304 | Upstream side transport roller pair |
| 305 | Downstream side transport roller pair |
| 306 | Pickup roller |
| 307 | Isolating roller |
| 308 | Separation member |
| 309 | Drive transmission means |
| 310 | Reverse roller pair |
| 314 | Original size sensor |
| 311 | Second transport path |
| 312 | Reverse gate |
| 313 | Switchback transport path |
| 316 | Transport sensor |
| 317 | Discharge sensor |
| 318 | Reading guide |

The invention claimed is:

1. An image reading apparatus comprising
an image reading unit that includes a platen glass and a color image sensor configured by a line image sensor for reading red, a line image sensor for reading green, and a line image sensor for reading blue, the line image sensors being disposed in a sub-scanning direction of an original,
wherein the line image sensor for reading red and the line image sensor for reading green are disposed so that a line gap therebetween is two lines, and
in a monochrome mode in which a color original is read and output as a monochrome image, a monochrome image is formed by only using data read by the line image sensor for reading red and data read by the line image sensor for reading green.

2. The image reading apparatus according to claim 1, wherein the line image sensor for reading red and the line image sensor for reading green are disposed with the line image sensor for reading blue being disposed therebetween.

3. The image reading apparatus according to claim 1, wherein the monochrome mode includes two modes consisting of a high image quality reading mode and a speed-priority reading mode in which reading is performed at mutually different resolutions.

4. The image reading apparatus according to claim 3, wherein the high image quality reading mode is a mode for performing reading at a resolution of 600 dpi, and the speed-priority reading mode is a mode for performing reading at a resolution of 300 dpi.

5. The image reading apparatus according to claim 1, further comprising an automatic original feeder, wherein the color image sensor is a contact image sensor provided on a transport path of the automatic original feeder.

6. The image reading apparatus according to claim 1, wherein the color image sensor is a contact image sensor provided so as to be movable along a bottom face of the platen glass, and reads an original placed on the platen glass.

7. An image forming apparatus including the image reading apparatus according to claim 1.

8. The image reading apparatus according to claim 1, wherein the line image sensor for reading red, the line image sensor for reading green, and the line image sensor for reading blue are disposed in this order at a pitch of a two-line gap.

9. An image reading apparatus comprising an image reading unit that includes a platen glass and a color image sensor configured by a line image sensor for reading red, a line image sensor for reading green, and a line image sensor for reading blue, the line image sensors being disposed in a sub-scanning direction of an original,
wherein the line image sensor for reading red and the line image sensor for reading green are disposed so that a line gap therebetween is two lines, and
the line image sensor for reading red and the line image sensor for reading green are disposed with the line image sensor for reading blue being disposed therebetween.

10. The image reading apparatus according to claim 9, wherein in a monochrome mode in which a color original is read and output as a monochrome image, a monochrome image is formed by only using data read by the line image sensor for reading red and data read by the line image sensor for reading green, and the monochrome mode includes two modes consisting of a high image quality reading mode and a speed-priority reading mode in which reading is performed at mutually different resolutions.

11. The image reading apparatus according to claim 10, wherein the high image quality reading mode is a mode for performing reading at a resolution of 600 dpi, and the speed-priority reading mode is a mode for performing reading at a resolution of 300 dpi.

12. The image reading apparatus according to claim 9, further comprising an automatic original feeder, wherein the color image sensor is a contact image sensor provided on a transport path of the automatic original feeder.

13. The image reading apparatus according to claim 9, wherein the color image sensor is a contact image sensor provided so as to be movable along a bottom face of the platen glass, and reads an original placed on the platen glass.

14. An image forming apparatus including the image reading apparatus according to claim 9.

* * * * *